United States Patent
Wötting et al.

(10) Patent No.: US 7,244,686 B2
(45) Date of Patent: Jul. 17, 2007

(54) BEARINGS PRODUCED FROM SILICON NITRIDE SUBSTANCES CONTAINING SINTERING ADDITIVES AND $SIO_2$

(75) Inventors: Gerhard Wötting, Coburg (DE); Mathias Herrmann, Coswig (DE); Grit Michael, Dresden (DE); Stefan Siegel, Dresden (DE); Lutz Frassek, Rödenthal (DE)

(73) Assignee: H.C. Starck Ceramics GmbH & Co. KG, Selb (DE)

( * ) Notice: Subject to any disclaimer, the term of this patent is extended or adjusted under 35 U.S.C. 154(b) by 0 days.

(21) Appl. No.: 11/583,560

(22) Filed: Oct. 19, 2006

(65) Prior Publication Data

US 2007/0060466 A1 Mar. 15, 2007

Related U.S. Application Data

(62) Division of application No. 09/529,680, filed as application No. PCT/EP98/06375 on Oct. 7, 1998, now abandoned.

(30) Foreign Application Priority Data

Oct. 20, 1997 (DE) ............................ 197 46 008

(51) Int. Cl.
    *C04B 35/584* (2006.01)
(52) U.S. Cl. ............... 501/97.2; 501/97.4; 384/492; 384/907.1
(58) Field of Classification Search ............ 501/97.2, 501/97.4; 384/492, 907.1
See application file for complete search history.

(56) References Cited

U.S. PATENT DOCUMENTS

| 3,836,374 | A |   | 9/1974  | Richerson et al. ............ 106/55 |
|-----------|---|---|---------|--------------------------------------|
| 4,517,037 | A | * | 5/1985  | Francis et al. ............ 156/89.27 |
| 4,607,017 | A | * | 8/1986  | Wolfe et al. ............... 501/97.2 |
| 4,826,791 | A | * | 5/1989  | Mehrotra et al. ............. 501/89 |
| 5,312,785 | A | * | 5/1994  | Pyzik et al. ............... 501/95.3 |
| 5,439,856 | A | * | 8/1995  | Komatsu .................... 501/97.2 |
| 5,508,241 | A |   | 4/1996  | Yeckley ........................ 501/97 |
| 5,523,268 | A | * | 6/1996  | Ukyo et al. ................... 501/92 |
| 5,635,431 | A | * | 6/1997  | Ikeda et al. ................ 501/97.3 |
| 5,804,523 | A | * | 9/1998  | Oda et al. ................... 501/97.2 |
| 5,885,916 | A | * | 3/1999  | Tajima et al. .............. 501/97.2 |
| 5,919,719 | A | * | 7/1999  | Sato et al. ................. 501/97.2 |
| 5,998,319 | A | * | 12/1999 | Hintermayer .............. 501/97.1 |

FOREIGN PATENT DOCUMENTS

| DE | 4318974    |     | 12/1994 |
|----|------------|-----|---------|
| EP | 414383     |     | 2/1991  |
| EP | 412428     |     | 12/1991 |
| EP | 529871     | *   | 5/1994  |
| EP | 649824 A2  | *   | 4/1995  |
| JP | 01219063 A |     | 9/1989  |
| JP | 401219063  | *   | 9/1989  |
| WO | 97/21644   | *   | 6/1997  |

OTHER PUBLICATIONS

Journal of the American Society of Lubrication Engineering, vol. 31, May 5-8, 1975, pp. 558-564, "Ceramic Airframe Bearings", Jan W. van Wyk.
Mat. Res. Soc. Symp. Proc., vol. 287 (month unavailable), 1993, pp. 533-538, K. Kanbara et al, "Corrosion of Silicon Nitride Ceramics by Nitric Acid".
Key Engineering Materials, vol. 113 (month unavailable), 1996, pp. 227-237, A. Okada et al, "Mechanical Degradation of Silicon Nitride Ceramics in Corrosive Solutions of Boiling Sulphuric Acid".
Corrosion of High Performance Ceramics, Springer-verlag, Berlin, 1992 (month unavailable), pp. 76-78, "Corrosion in Liquid Media", Y.G. Gogotsi et al.
Materials Science & Technology, vol. 17B, Processing of Ceramics, VCH Weinheim, Part II, pp. 4-47, 1996 (month unavailable), R.W. Cahn et al "Advanced Ceramics from Inorganic Polymers".
Pract. Met. 27, 1990 (month unavailable), pp. 503-513, P. Obenaus et al "Method of Quantitatively Characterising Columnar Crystals in Silicon Nitride Ceramics".

* cited by examiner

*Primary Examiner*—Karl Group
(74) *Attorney, Agent, or Firm*—Connolly Bove Lodge & Hutz LLP

(57) ABSTRACT

The present invention is directed to bearings produced from a silicon nitride material. The silicon nitride material consists of a sintering aid selected from the group consisting of $Al_2O_3$ and $Y_2O_3$, silicon dioxide, and optionally, up to 10 mole %, based on the amount of silicon nitride, of an additive that reacts with silicon nitride, said additive selected from the group consisting of $TiO_2$, $WO_3$, $MoO_3$ and mixtures thereof.

1 Claim, No Drawings

BEARINGS PRODUCED FROM SILICON NITRIDE SUBSTANCES CONTAINING SINTERING ADDITIVES AND SIO$_2$

CROSS-REFERENCE TO RELATED APPLICATIONS

This application is a divisional application of U.S. application Ser. No. 09/529,680, filed on Apr. 17, 2000, now abandoned which in turn was based on PCT application Serial No. PCT/EP98/06375, filed on Oct. 7, 1998, which in turn claimed priority under 35 U.S.C. 119 on German Patent Application 197 46 008.9, filed on Oct. 20, 1997.

BACKGROUND OF THE INVENTION

The present invention relates to silicon nitride materials containing sintering aids and SiO$_2$, a process for producing them and their use.

Ceramic materials are finding ever wider use in the construction of machinery and apparatus, in particular in bearings (Ceramic Airframe Bearings: Lubrications Engeneering, 31 (1975), 558-564). All-ceramic bearings have proven useful particularly in applications where there is little lubrication and in corrosive media. However, it has been found in a wide variety of application areas for components made of high-performance ceramic that they degrade and that their life cannot be reliably predicted. The corrosion resistance is dependent to a considerable extent on the type of corrosive medium, the material composition and the superposed mechanical stress. The cause of this is the different reaction behaviour of the individual components of the microstructure of the ceramics (matrix grains, grain boundary phases, impurities) towards acids, bases or under hydrothermal conditions. Liquid-phase-sintered materials such as silicon nitride or silicon carbide (LPSSIC) which contain from 5 to 20% by volume of grain boundary phases display attack along the grain boundary phase in acids and bases. In general, the main point of attack in acid and alkali corrosion in the temperature range <180° C. is the grain boundary phase. However, this is not leached out entirely, which is made clear by materials which are corroded through to the centre still having strengths of from 300 to 400 MPa.

The corrosion rates for corrosion in the acid range are strongly dependent on the material composition. EP-A 649 824 discloses that MgO/Al$_2$O$_3$-containing materials have good acid resistance without the cause of this behaviour being completely known. One way of further improving the acid resistance of silicon nitride materials containing rare earth metal oxides, Y$_2$O$_3$ and possibly Al$_2$O$_3$ as sintering aids is to reduce the amount of these sintering aids. However, the resulting improvement in the corrosion resistance has to be bought by higher manufacturing costs, since HIP technology is required for densification (EP-A 414 383). Furthermore, Mater. Res. Soc. Symp. Proc. 287 (1993) and Key Engeneering Materials 113 (1996), pp. 227-237, report that corrosion is reduced at very high concentrations of acids, which in the case of phosphoric acid could be explained by formation of a passive layer, see Corrosion of High Performance Ceramics; Springer Verlag, Berlin, 1992; pp. 76 to 78.

DESCRIPTION OF THE INVENTION

There is therefore a great need for acid-stable ceramic materials.

It is therefore an object of the invention to provide ceramic materials based on Si$_3$N$_4$ which have a high corrosion resistance, i.e., for example, a low mass change and low strength losses after acid treatment.

It has now been found that a silicon nitride material has, regardless of the way in which it is produced, a high corrosion resistance towards acids if it has a very high SiO$_2$ content and formation of silicon oxide nitride is avoided, i.e. if the molar ratio of the silicon dioxide in the grain boundary phase to the sintering aids including SiO$_2$ in the grain boundary phase is >60% and the oxide nitride content (Si$_2$N$_2$O content) is <1%.

The invention accordingly provides silicon nitride materials containing sintering aids and SiO$_2$ and having a molar ratio of the silicon dioxide in the grain boundary phase to the sintering aids including SiO$_2$ in the grain boundary phase is >60%, preferably >65%, and the oxide nitride content (SiO$_2$N$_2$O) is <1%.

For the purposes of the present invention, sintering aids are the added substances which form the liquid phase during sintering and remain in the grain boundary phase.

The grain boundary phase in silicon nitride materials is formed by solidification of the liquid phase present during sintering. It contains the sintering additives, silicon dioxide and sometimes dissolved silicon nitride. Depending on the conditions of the thermal treatment (cooling rate, etc), it is amorphous or partially crystalline. In general, it wets the silicon nitride particles and forms a three-dimensional network.

Sintering aids present in the grain boundary phase for the purposes of the invention are preferably Y$_2$O$_3$, Sc$_2$O$_3$, rare earth metal oxides, alkaline earth metal oxides and Al$_2$O$_3$.

The amount of the added sintering aids+SiO$_2$ is preferably selected so that the proportion of grain boundary phase in the sintered material is <20% by volume, particularly preferably 0.1-17% by volume, very particularly preferably from 3 to 15% by volume.

In one embodiment of the invention, the silicon nitride materials contain further additives.

Such additives are, for example, reactive additives, i.e. ones which react with Si$_3$N$_4$ and form SiO$_2$, for example TiO$_2$, WO$_3$ and/or MoO$_3$. Thus, TiO$_2$, for example, reacts to form TiN, while, for example, WO$_3$ and MoO$_3$ form silicides with simultaneous oxidation of Si$_3$N$_4$ to SiO$_2$.

It is likewise possible to use additives which are retained as disperse phases, for example SiC, TiN, MoSi$_2$, TiCN and/or HfO$_2$ or else additives which form mixed crystals with the Si$_3$N$_4$, for example AlN.

The additives which react with Si$_3$N$_4$ and form SiO$_2$ are preferably present in an amount of from 0 to 10 mol %, preferably <5 mol %, based on Si$_3$N$_4$.

The additives remaining as a disperse phase are preferably present in an amount of from 0 to 30% by volume.

Additives which form mixed crystals are preferably present in amounts of from 0 to 50 mol %, preferably <15 mol %, based on Si$_3$N$_4$.

In a preferred embodiment of the invention, the porosity of the material is <2%.

The invention additionally provides a process for producing the material of the invention, in which, either alone or in combination, a) the Si$_3$N$_4$ powder used, either alone or together with the sintering aids and, if desired, further additives, is thermally oxidized or b) the Si$_3$N$_4$ powder, either alone or together with the sintering aids and, if desired, further additives, is tribooxidized during milling or c) the Si$_3$N$_4$ powder is admixed with sintering aids or with SiO$_2$ or at least one SiO$_2$-forming component either before or during milling.

Any commercial Si$_3$N$_4$ powder can be used for the processes according to a), b) and c).

The thermal oxidation a) is carried out in an oxidizing atmosphere, preferably in air, $O_2$ and/or water vapour at temperatures of from 300 to 1400° C. In the variant a), a milling step can also be carried out before or after the oxidation.

The tribooxidation b) during milling is carried out by intensive milling of the $Si_3N_4$ powder dry or in a liquid such as $H_2O$ or an organic solvent, e.g. acetone, hexane or alcohol.

Milling is preferably carried out in ball mills and is continued until the milled $Si_3N_4$ has a mean particle size ($d_{50}$), preferably measured by means of a Master Sizer S, of <2.5 µm, preferably <1 µm, and has the required molar ratio of $SiO_2$ to sintering aids.

In the variant c), the $SiO_2$-forming components used can be siloxanes, silanes, silicone resins, (see Material Science and Technology Vol. 17B, Processing of Ceramics, VCH, Weinheim, (1996) Part II, 4-47, DE-A 43 18 974, EP-A 0 412 428. or the reactive additives described, e.g $TiO_2$, $WO_3$ and $MoO_3$).

The amount of $SiO_2$-forming components is dependent on the desired $SiO_2$ content of the sintered body.

The production of the sintered material from the powder mixtures obtained according to the variants a), b) and/or c) is preferably carried out using generally customary ceramic technology.

The incorporation of the sintering aids or the additives which form mixed crystals and/or $SiO_2$ into the silicon nitride crystal lattice can also influence the ratio of $SiO_2$ to the sintering aids. In this case, when determining the $SiO_2$/sintering aid ratio, the proportion of the original sintering aids or $SiO_2$ has to be reduced by the proportion incorporated into the crystal lattice. This is of particular significance in the case of α'-and β'-SiAlONs, e.g. according to the following equation:

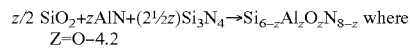

$$z/2\ SiO_2 + zAlN + (2\tfrac{1}{2}z)Si_3N_4 \rightarrow Si_{6-z}Al_zO_zN_{8-z} \text{ where } Z = 0{-}4.2$$

This has to be taken into account when calculating the amounts to be weighed out.

The invention additionally provides for the use of the materials of the invention in the construction of machinery and apparatus, in particular in bearings.

The following examples serve to illustrate the invention without having any limiting character.

EXAMPLES

Example 1

$Si_3N_4$ powder (Baysinid®, obtainable from Bayer AG), $Y_2O_3$ (grade fine, obtainable from H.C. Starck) and $Al_2O_3$ powder (AKP-50®, obtainable from Sumitomo) and $TiO_2$ (P25, obtainable from Degussa) are mixed in amounts corresponding to the composition indicated in Table 1, homogenized in a stirred ball mill in aqueous suspension for 3 hours, spray dried and pressed to form bodies having dimensions of 50×60×8 mm. The particle size ($d_{50}$) of the mix after homogenization was 0.5 µm, measured by means of a Master Sizer S at pH 11.0. The bodies are baked out at 600° C. for 1 hour in air. They are sintered under gas pressure at 1830° C. and 50 bar of $N_2$ for 1.5 hours. The weight losses of the specimens were from <0.3 to 1.8%, depending on the $TiO_2$ content of the mix. The sintered specimens are cut into test bars and the surfaces were ground.

Mix 1 b was milled for 6 hours at a higher rotational speed in order to increase the oxygen content.

Example 2

This example was carried out using a method analogous to Example 1. The deviations are described below.

Examples 2a and 2b were prepared using a method analogous to Example 1b.

The sintering of Example 2a was carried out in a BN-coated graphite crucible in a BN powder bed. The weight loss was 1.8%. In Example 2b, the sample was sintered in an RBSN crucible. The weight loss was 0.2%.

In Example 2c, 1.5% of silicone resin was additionally used as binder. Examples 2e and 2f were produced from silicon nitride powder produced by the plasma method and having a surface area of 60 m²/g and an $SiO_2$ content of 8%. The specimens were hot pressed at 1800° C.

Example 3

The test specimens were produced using a method similar to Example 1. Densification was carried out by a sinter-HIP method, and the weight loss was reduced to <1.5% by means of the RBSN crucible and a high sample volume/available volume ratio.

Example 4

The test specimens were produced using a method analogous to Example 2.

Example 5

The test specimens were produced using a method analogous to Example 1, with sintering being carried out at 1800° C.

The respective results are listed in Table 1. By way of example, the mass losses of Examples 1-4 recorded in the corrosion resistance test are shown in FIG. 1.

The following measurement methods were employed for determining the data reported in Table 1:

Flexural test bars having dimensions of 3×4×50 mm were cut from the sintered bodies and used to determine the mechanical properties and the corrosion performance.

The strength was determined by means of the 4-point method (support spacing: 20/40 mm).

The corrosion performance was determined in thermostated glass vessels using 1 N acid. The acid/solid ratio was >200 ml/10 g of specimen. The acid was changed every 100 hours. The mass loss of the specimens was determined by periodic weighing at defined time intervals (see Δm in Tab. 1). The specimens were rinsed with distilled water and dried before weighing.

The oxide nitride content was determined on the specimens by means of XRD measurements. This was carried out using CuKα radiation. The quantitative determination was carried out by means of a Rietveld programme (Refine++). The detection limit was 0.8% by mass of $Si_2N_2O$.

The oxygen content was determined by the hot gas extraction method. The error was <0.1% by mass. The $SiO_2$ content was calculated from the oxygen content.

The porosity was determined in polished sections (prepared as described in Practical Metallography, 27 (1990, 503-513)) at a magnification of 1000 by means of automatic image analysis (Quantiment 570). The proportion by area of the pores in the polished section was taken as the proportion by volume. In parallel thereto, the density was determined by the Archimedes method, in accordance with EN 993-1.

TABLE 1

Compositions and corrosion performance of the materials

| No. | | Additives | $SiO_2/^x$ (additive + $SiO_2$) mol % | $Si_2N_2O/$ $(Si_2N_2O) +$ $\beta Si_3N_4$ Oxide nitride content % | Properties uncorroded Porosity | $\sigma 4b$ MPa | Corrosion conditions. | $\Delta m(100\ h)$, $mg/cm^2$ | $\Delta m(500\ h)$, $mg/cm^2$ | $\sigma 4b$, MPa (500 h) |
|---|---|---|---|---|---|---|---|---|---|---|
| 1a | C | $5Y_2O_3 2Al_2O_3 1TiO_2$ | 45 | 0 | <0.5 | 850 | in HCl, 60° C. | 5.6 | 8.5 | 450 |
| 1b | I | $5Y_2O_3 2Al_2O_3 1TiO_2 + SiO_2$ | 65 | 0 | <0.5 | 850 | | 0.3 | 0.3 | 800 |
| 1c | I | $5Y_2O_3 2Al_2O_3 5TiO_2$ | 74 | 0 | <0.5 | 825 | | 0.24 | 0.26 | 750 |
| 1d | C | $5Y_2O_3 2Al_2O_3 7.5TiO_2$ | 80.4 | 33 | <0.5 | 800 | | 7.5 | 9.5 | 550 |
| 2a | C | $5Y_2O_3 3Al_2O_3$ | 30 | 0 | <0.5 | 800 | in HCl, 60° C. | 10 | 16 | 450 |
| 2b | I | $5Y_2O_3 3Al_2O_3$ | 74 | 0 | <0.5 | 820 | | 0.2 | 0.2 | 750 |
| 2c | I | $5Y_2O_3 3Al_2O_3$ | 72 | 0 | <0.5 | 800 | | 0.21 | 0.23 | 730 |
| 2d | C | $5Y_2O_3 3Al_2O_3$ | 30 | 0 | <0.5 | 820 | in $H_2SO_4$, 60° C. | 9 | — | 450 |
| 2e | I | $5Y_2O_3 3Al_2O_3 + SiO_2$ | 63 | 0 | <0.5 | 725 | | 0.32 | 0.38 | 650 |
| 2f | C | $5Y_2O_3 3Al_2O_3 + SiO_2$ | 81 | 27 | <0.5 | 765 | | 2.2 | 8.3 | 530 |
| 3 | I | $5Y_2O_3 1.5\ Al_2O_3 + 0.5TiO_2$ | 63 | 0 | <0.5 | 800 | in $H_2SO_4$, 60° C. | 0.35 | 0.5 | 700 |
| 4 | C | $3Y_2O_3 1.8\ Al_2O_3$ | 75.3 | 12 | <0.5 | 730 | | 1.4 | 4.5 | 520 |
| 5a | I | $3MgO 2Al_2O_3$ | 75 | 0 | <0.5 | 820 | in $H_2SO_4$, 60° C. | 0.1 | 0.1 | 750 |
| 5b | C | $3MgO 2Al_2O_3$ | 45 | 0 | <0.5 | 730 | | 0.3 | 0.45 | 630 |

C = comparative example;
I = example according to the invention
2a mass loss on sintering = 1.6%;
2b mass loss on sintering = 0.2%
$^x$in the grain boundary phase Discussion of the Results:

The material described in EP-A 649 824 was reproduced in Example 1 without controlling the oxygen content and, under our conditions, displays a mass loss of 8.5 mg/cm². Setting the $SiO_2$ content leads to an improvement in the corrosion performance of nominally identical materials by a factor of 30 (as demonstrated by Examples 1a and 1b). The importance of controlling the oxygen content not only in preparation of the mix is shown by comparison of Example 2a with Examples 2b and 2c. While sintering of the material in Example 2a leads to a high weight loss which drastically reduces the $SiO_2$ content of the sintered material, specimens which were sintered under controlled conditions and have a small weight loss (2b and 2c) display the favourable corrosion performance sought.

It is found that the high $SiO_2$ content leads to a change in the corrosion kinetics. While conventional materials have a linear relationship between corrosion layer thickness and reaction time up to corrosion layer thicknesses of several 100 μm, in the case of the materials of the invention, passivation occurs after only a few μm reaction depth (FIG. 2). This passivation occurs all the more quickly, the lower the additive content and the lower the grain size of the silicon nitride grains in the material.

The invention claimed is:

1. A bearing produced from a silicon nitride material consisting of
   (a) a sintering aid selected from the group consisting of $Al_2O_3$ and $Y_2O_3$,
   (b) silicon dioxide, and
   (c) optionally, up to 10 mole %, based on the amount of silicon nitride, of an additive that react with silicon nitride, said additive selected from the group consisting of $TiO_2$, $WO_3$, $MoO_3$ and mixtures thereof,
   wherein the sintering aid and the silicon dioxide are present in a grain boundary phase, and wherein
   i) the amounts of silicon dioxide and the sintering aid in the grain boundary phase are such that the molar ratio of (silicon dioxide) to (silicon dioxide and sintering aid) is from 0.65:1 to 0.74:1,
   ii) the silicon nitride material has a silicon oxide nitride content of less than 1% by weight,
   iii) said silicon nitride material has a porosity of less than 0.5% by volume, and
   iv) said silicon nitride material has a mass loss of less than or equal to 0.3 mg/cm² when immersed in HCl at a temperature of 60° C. for 500 hours.

\* \* \* \* \*